(12) United States Patent
Krzyzanowski et al.

(10) Patent No.: US 11,080,014 B2
(45) Date of Patent: Aug. 3, 2021

(54) SYSTEM AND METHOD FOR MANAGING MULTIPLE APPLICATIONS IN A DISPLAY-LIMITED ENVIRONMENT

(71) Applicant: Xevo Inc., Bellevue, WA (US)

(72) Inventors: Paul Krzyzanowski, Readington Township, NJ (US); Richard Chia Tsing Tong, Seattle, WA (US)

(73) Assignee: XEVO INC., Bellevue, WA (US)

( * ) Notice: Subject to any disclaimer, the term of this patent is extended or adjusted under 35 U.S.C. 154(b) by 0 days.

(21) Appl. No.: 16/289,138

(22) Filed: Feb. 28, 2019

(65) Prior Publication Data

US 2020/0278830 A1 Sep. 3, 2020

(51) Int. Cl.
*G06F 3/0481* (2013.01)
*G06F 3/16* (2006.01)
*H04L 29/08* (2006.01)

(52) U.S. Cl.
CPC .......... *G06F 3/167* (2013.01); *G06F 3/04817* (2013.01); *H04L 67/125* (2013.01)

(58) Field of Classification Search
CPC ..... G06F 3/167; G06F 3/04817; H04L 67/125
See application file for complete search history.

(56) References Cited

U.S. PATENT DOCUMENTS

| 8,589,727 | B1 * | 11/2013 | Fletcher | G06F 11/3006 714/13 |
| 10,057,399 | B2 * | 8/2018 | Song | G01C 21/3688 |
| 2015/0268801 | A1 * | 9/2015 | Song | H04M 1/72527 701/1 |
| 2018/0356243 | A1 * | 12/2018 | Mehta | G01C 21/362 |

FOREIGN PATENT DOCUMENTS

EP 3495950 A1 * 6/2019 ............... G06F 9/50

* cited by examiner

*Primary Examiner* — Namitha Pillai
(74) *Attorney, Agent, or Firm* — Seed IP Law Group LLP

(57) ABSTRACT

Embodiments are directed towards providing a system that provides an environment in which multiple user applications can be executed in the background of a vehicle head unit without direct interaction by a user of the head unit. A category-management application is configured to communicate with the user applications. The category-management application receives a request for content. The category-management application provides a request to one or more of the user applications to cause the user applications to execute as background processes to fulfill the request. The category-management application receives responses from the user applications. The category-management application selects and presents content associated with the fulfilled request to the user.

15 Claims, 5 Drawing Sheets

SYSTEM AND METHOD FOR MANAGING MULTIPLE APPLICATIONS IN A DISPLAY-LIMITED ENVIRONMENT

TECHNICAL FIELD

The present disclosure relates generally to the management of applications executing on a vehicle head unit and their ability to output visual content on a display of the head unit.

BACKGROUND

Description of the Related Art

Automobiles are becoming more and more user friendly and interactive. Many new cars are now manufactured with a user interface, called a head unit, which a user can use to control various aspects of the automobile and access a variety of content or applications. For example, the user can use the head unit to change radio stations, change the temperature of the automobile cabin, access maps and global positioning systems, receive media streams via the Internet, access various Internet-based services, or access or control other accessories of the automobile. The head unit can also provide various types of information or content to the user, such as when the automobile is due for an oil change or when a tire rotation should be performed, to name a few.

To view most of this information, users navigate through multiple screens and options to access different accessory information or applications. This mode of interaction is similar in many respects to that of smartphones, where one may have screen after screen along with multiple folders of apps. This type of user interaction, however, can be a great distraction, especially to the driver. Not only can such distractions be a safety issue, many jurisdictions are now starting to limit the amount and type of content or interactions that users can perform on a head unit. The phone-like app-as-an-icon model does not always lend itself well to the in-vehicle experience. It is with respect to these and other considerations that the embodiments described herein have been made.

BRIEF SUMMARY

Briefly stated, embodiments are directed towards a system that provides an environment in which multiple user applications, which manifest themselves as services, can be executed in the background of a vehicle head unit without direct screen interaction with the user applications by a user of the head unit. That is, certain applications may be run without a user selecting a dedicated application icon and without the application taking over the display when run. A category-management application on the head unit is configured to communicate with a plurality of user applications that are stored on the head unit or stored on a mobile device of the user. The category-management application receives a request to interact with one or more of the user applications. This request may be directly from a user, from the user via a navigation application, from the user applications themselves, from other user or system applications, or from an accessory of the vehicle. The category-management application provides the request to one or more user applications to cause the user applications to execute in the background of the head unit to fulfill the request. The category-management application receives response information from each user application that fulfills the request and presents associated content to the user. The presentation of the content may include a display of visual content, such as via a map displayed by the navigation application, or an audio output, such as via a speaker in the vehicle.

The environment provided by the system described herein reduces distractions caused by a user interacting with the head unit to access user applications, while also increasing the amount of content that can be presented to the user. It also reduces the complexity of the interface by not having to present the user with a distinct icon and application for each service. For example, if a user likes to get gas at particular gas stations because they receive loyalty points from those gas stations, the user can perform a one-time download of the user applications for each gas station brand they care about. These applications are generally brand-specific services that are accessed from a generic "fuel" application that manages the category of fuel services. When the user decides to get gas, the user can simply activate a gas button on the head unit. Embodiments described herein cause a category-management application to access each of the user's user gas applications to get a location of the nearest gas station associated with that application. The navigation application can then be utilized to display a map with icons representative of the locations of those stations. As another example, a geolocation search can automatically find and launch an application based on a triggered event, such as "ignition off."

Therefore, instead of having the user manually select and interact with each gas application to obtain a nearest location and then remember where that gas station is located as the user searches through all applications, embodiments described herein provide an automated system for obtaining information from user applications without having the user interact with those applications individually. Accordingly, the user is not distracted with searching multiple user applications and the user is presented with additional content from each user application. Embodiments described herein also utilize the leverage of the information obtainable by the user applications to augment the content presented by the head unit, which reduces the need to update the head unit with new content.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

Figure 1:
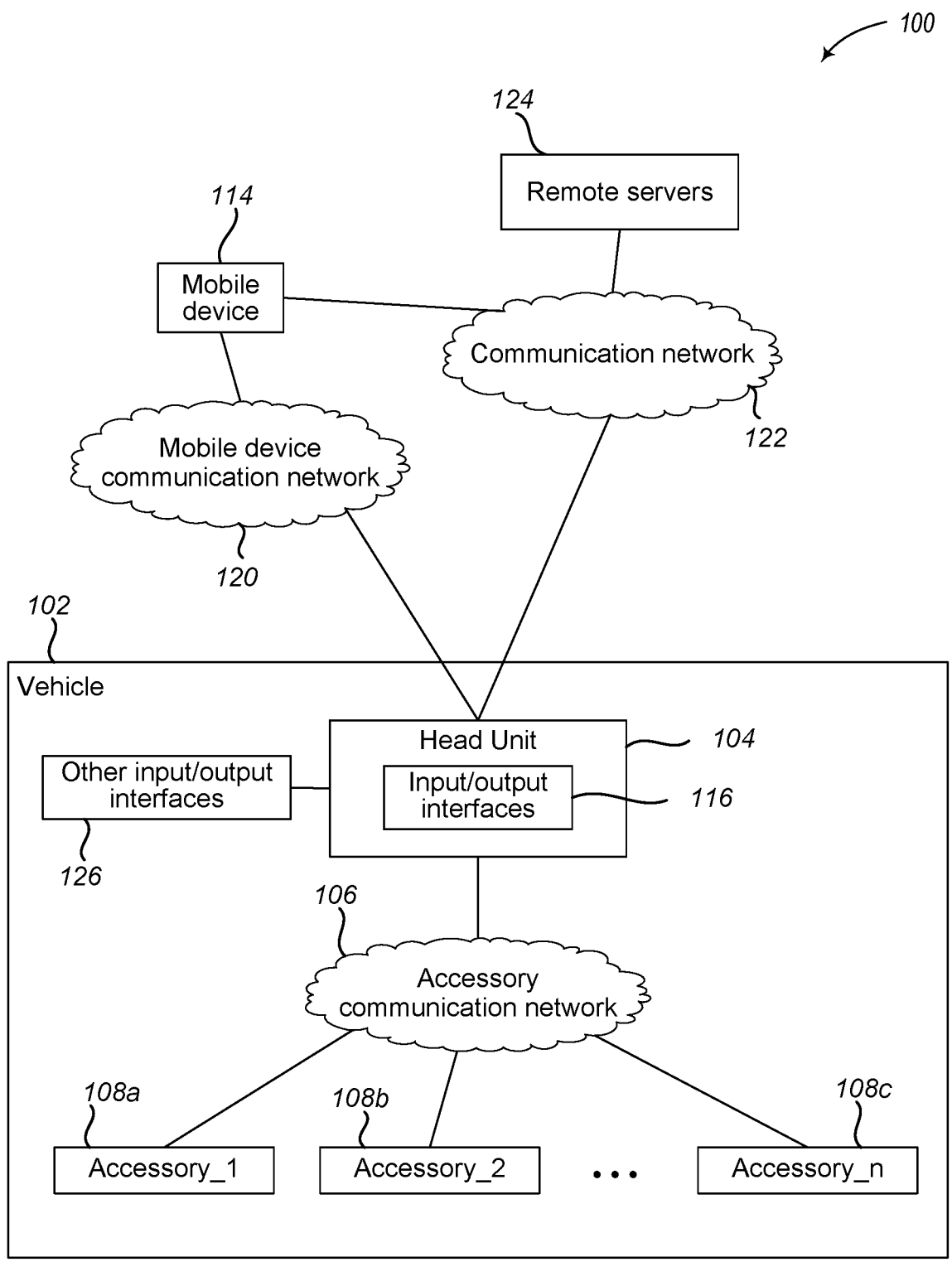
FIG. 1 illustrates a context diagram of a vehicle environment that utilizes a head unit to present content to a user in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the vehicle environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "user" is defined as a person or occupant that is in or otherwise being transported by a vehicle. The user may be the driver or a passenger of the vehicle. The term "vehicle" is defined as a device used to transport people or goods (or both), and examples include automobiles, buses, aircraft, boats, or trains. A "processor" is defined as a component with at least some circuitry or other hardware and that can execute instructions. The term "head unit" is defined as a component with at least some circuitry that is part of a vehicle and presents content to a user (as defined above). The term "present" is defined as to bring or introduce to the presence of a user through some sensory interaction.

The term "content" is defined as information that can be presented to a user of the vehicle. Content may include visual content, audio content, tactile content, or some combination thereof. Visual content can include text, graphics, symbols, video, or other information that is displayed to a user. Audio content can include songs, vocals, music, chimes, or other types of sounds. Tactile content can include vibrations, pulses, or other types of touch-based sensations provided via a haptic interface. Generalized types of content can include advertisements, sports scores or information, logos, directions, restaurant menus, prices, hours of operation, coupons, descriptive information, emergency instructions, etc.

FIG. 1 illustrates a context diagram of a vehicle environment that utilizes a head unit to present content to a user in accordance with embodiments described herein. System 100 includes a vehicle 102 that has a head unit 104 and one or more accessories 108a-108c. The vehicle 102 is virtually any means of transportation that includes a computing device and an output interface to provide content to a user of the vehicle 102. In the illustrative examples described herein, the computing device of the vehicle is the head unit 104, although other types of computing devices may be employed.

The head unit 104 is a computing device that provides content, interactive controls, user interfaces, or other information to users of the vehicle 102. In various embodiments, the head unit 104 utilizes one or more input/output interfaces for user interactions, which may be integrated into the head unit 104 (e.g., input/output interfaces 116) or external to the head unit 104 (e.g., other input/output interfaces 126). In some embodiments, the input/output interfaces 116 or a portion thereof may be part of or embedded within the head unit 104. In other embodiments, the other input/output interfaces 126 or a portion thereof may be separate from or independent of the head unit 104. In various embodiments, the head unit 104 may utilize some combination of the input/output interfaces 116 and the input/output interfaces 126. For example, the head unit 104 may include a built-in display device to output visual content and utilize a separate speaker that is external to the head unit 104 to output audio content. The head-unit-integrated input/output interfaces 116 and the other external input/output interfaces 126 may be collectively referred to as input/output interfaces 116, 126.

The input/output interfaces 116, 126 are configured to receive input from a user of the vehicle 102 or to output content to a user of the vehicle 102. The input/output interfaces 116, 126 may include one or more output interfaces, which may include a visual interface, such as a display device; an audio output interface, such as a speaker; a haptic interface, such as a tactile output device; or a combination thereof. Therefore, the input/output interfaces 116, 126 may include one or more output interfaces configured to output visual content, audio content, tactile content, or some combination thereof.

The input/output interfaces 116, 126 may also include one or more input interfaces, which may include input buttons, a touchscreen, a microphone, or other input interfaces. Therefore, the input/output interfaces 116, 126 may include one or more input interfaces configured to receive visual, audio, physical input commands, or some combination thereof. Embodiments described herein regarding the head unit 104 as receiving input or providing output may be performed by an internal or integrated input/output interface 116 or other external input/output interfaces 126, or some combination thereof. As an illustrative example, the head unit 104 may provide a navigation interface, audio and radio controls, environmental controls, vehicle performance or maintenance information, or other types of content.

An accessory 108a-108c can be any device or process that provides information or data directly or indirectly (such as via the head unit 104) to the user. Examples include the following: gas-level gauge, speedometer, odometer, oil-pressure gauge, temperature gauge, tire-pressure gauge, GPS device, ignition-status indicator, gear-shift mechanics or electronics indicating a gear state or change of state, seat-belt-status indicator, seat-weight sensors, clock, or other vehicle sensor that provides information to a user. Additional information on the accessories 108a-108c will be presented below.

In various embodiments described herein, the head unit 104 provides an environment in which category-management applications access and manage user applications such that the category-management applications present content to a user of the head unit 104 without the user interacting directly with the user applications. As an example, the content may be presented to the user through an interactive element, like a navigation application. These category-management applications may be applications that execute to coordinate requests and information between the user (via the interactive element) and the user applications. The user applications may be individual applications selected or downloaded by the user or pre-installed applications. Accordingly, user applications may obtain or provide content to a user. Moreover, user applications may be self-sufficient and not have to interact with a remote server or service or alternatively, the user application may exchange content with a remote server. In some embodiments, user applications may be full-service applications that utilize user input to obtain content, present content to the user, or provide content to a remote server. In other embodiments, user applications may be background applications or processes that are not under the direct control of an interactive user.

For example, the head unit 104 may have stored thereon a navigation application and one or more category-management applications, such as a gas application or a food application. The head unit 104 also has stored thereon a plurality of user applications, which, for illustrative purposes, may include examples such as Gas_Station_ABC, Gas_To_Go, SuperStoreGas, Burger_Joint, and Taco_Today. Each of these user applications provides many different functions, from enabling a user to order food to providing a daily coupon to the user. The gas application accesses and interacts with Gas_Station_ABC, Gas_To_Go, and SuperStoreGas, and the food application accesses and interacts with Burger_Joint and Taco_Today.

The user applications can provide information or content to the category-management applications unrequested or in response to a request from the category-management application. The category-management application then determines if and how to present the information or content to the user of the head unit 104. Continuing the example, the gas application can obtain a current location, current route (e.g., a full route to a destination or a partial route for a select amount of time or distance), or destination of the vehicle 102, such as from the navigation application. The gas application then provides this current location information to each user application and requests a nearest store location associated with that user application. In response, one or more of Gas_Station_ABC, Gas_To_Go, and SuperStoreGas provides the gas application with coordinates of its nearest corresponding gas station with respect to the current location of the vehicle 102. The gas category-management application then provides the coordinates to the navigation application to display an icon representative of the location of one or more of the nearest gas stations on a map. In some embodiments, the gas user applications may also present other content to the gas category-management application, such as a company logo, prices, coupons, or other content.

The navigation application responds to the gas category-management application by presenting the location of the nearest gas stations to the user of the vehicle 102 via the head unit 104. In this way, the user of the head unit 104 can see the closest gas stations associated with the gas user applications without having to open each gas user application to separately request a nearest location. In many instances, user applications are updated from time to time to include more functionality, include additional store locations, etc. The interaction between the category-management applications and the user applications, described herein, allows for the head unit 104 to present updated information from the user applications.

As another example, an accessory 108a-108c or some process, like the navigation application, may monitor one or more parameters or variables, such as the vehicle's location or fuel level, and if certain conditions are met, may send messages to user applications related to the parameters or variables or surface the information to the user. In one example, a background process may periodically check the fuel level. When it's below a threshold value and the navigation application detects there's a gas station close by, the head unit 104 may present that gas station interface to the user. In another example, a user may have ordered food from a quick-service restaurant. A background process (possibly the same restaurant user application or a generic tracking user application) can send a message to the restaurant user application when the vehicle is within a certain distance from the restaurant. The restaurant user application can then forward the message to the restaurant's web-service interface using its own proprietary mechanisms. This step can allow the restaurant to start preparing the food in anticipation of the arrival of the user. In some embodiments, the generic tracking user application could be a generic in-vehicle user application that allows arbitrary applications to use a subscribe-publish model to request alerts when the vehicle is in a certain area.

Although the previous examples describe the user applications as being stored on the head unit 104, embodiments are not so limited. In some embodiments, one or more of the user applications may be stored on a mobile device 114 that is separate from the head unit 104. In this example, the category-management applications executing on the head unit 104 communicate with the mobile device 114 to obtain content or information for presentation to the user via the input/output interfaces 116, 126. The user applications may also be completely cloud hosted, running on one or more remote servers 124. In this case, the category-management applications are configured to be aware of them and how to communicate with them, as necessary. In this instantiation, the user applications operate much like web services. Category-management applications can subscribe to asynchronous notifications of events or send requests and receive responses via a communication network to exchange data with the user applications.

In various embodiments, the head unit 104 may be configured to communicate with other computing devices, such as mobile device 114 or remote server 124. For example, the head unit 104 may interact with user applications executing on the mobile device 114 via mobile device communication network 120. Similarly, the head unit 104 may communicate with remote server 124 via communication network 122 to obtain content or other information, such as in response to a request from a user application, or interact with cloud-based user applications, as noted earlier.

In at least one embodiment, the mobile device 114 may act as an intermediate device between the head unit 104 and the remote server 124.

The remote server 124 is any computing device, such as a server computer, cloud resources, a smartphone or other mobile device, or other computing device, which is remote to the vehicle 102 and can provide content or other information to the head unit 104 or the mobile device 114. Although the remote server 124 is illustrated as a single device, embodiments are not so limited. Rather, the remote server 124 may be one or more computer devices, including those that collectively perform functions.

The mobile device 114 includes any device capable of communicating with a head unit 104 of the vehicle 102 or remote server 124. The mobile device 114 is configured and structured to send and receive information, content, or controls to and from the head unit 104 or the remote server 124. Examples of the mobile device 114 include laptop computers, smart phones, tablet computers, wearable computing devices, other smart devices, or other handheld computing devices.

In some embodiments, the remote server 124, the head unit 104, and the mobile device 114 communicate with each other via a communication network 122. The communication network 122 is configured to couple various computing devices to transmit data from one or more devices to one or more other devices. Communication network 122 includes various wireless networks that may be employed using various forms of communication technologies and topologies, such as cellular networks, mesh networks, or the like.

In various embodiments, the head unit 104 communicates with the mobile device 114 via a mobile device communication network 120. The mobile device communication network 120 is configured to couple the mobile device 114 with the head unit 104 to transmit content/data between the mobile device 114 and the head unit 104. The information communicated between devices may include current accessory status or data, vehicle status information, requests to access accessory data, requests to control or modify an accessory, video data, voice data, image data, text data, or other types of content, data, or information. The communication network 120 may include a variety of short-range wireless communication networks, such as personal area networks utilizing classic Bluetooth or Bluetooth Low Energy protocols, Wi-Fi, USB, an IR optical network, or network 120, to enable communication between the mobile device 114 and the head unit 104. The communication network 120 may also be implemented using Internet connectivity over wide-area cellular networks (such as 4G and 5G networks).

In various embodiments, the user may interact with the head unit 104 via the mobile device 114 such that the mobile device 114 acts as a virtual head unit. In this way, user input provided to the head unit 104 may be received from the user via the mobile device 114 and transmitted from the mobile device 114 to the head unit 104 for processing by the head unit 104. Conversely, content to be presented to the user may be provided to the mobile device 114 from the head unit 104 and displayed or otherwise output to the user from the mobile device 114. In some other embodiments, the mobile device 114 may perform the functionality of head unit 104 or may project one or more of its applications to the head unit 104.

The mobile device communication network 120, the communication network 122, and the accessory communication network 106 may be separate communication networks, as illustrated, or some of them may form the same communication network or share network components.

The head unit 104 may also be configured to access or receive information or control use of the one or more accessories 108a-108c. The accessories 108a-108c include virtually any vehicle utility or device that provides information or data to the user, including data received from core components of the vehicle 102 via the vehicle's Controller Area Network (CAN bus). Accessories 108a-108c may also include applications executing on the head unit 104 that provide information to the user or have two-way interactions with the user. Examples of these accessories include navigation, audio and radio controls, television or music applications, environmental control applications, vehicle performance or maintenance applications, or other applications.

Accessories 108a-108c may also receive information from other sources. For example, in some embodiments, the accessories 108a-108c may collect "derived accessory data" from internal-facing or external-facing cameras or other sensors. Derived accessory data is information about an environment associated with the vehicle that can provide additional details or aspects of the operation of the vehicle, as described herein. For example, images from a camera on the vehicle may be analyzed to determine which user is in the vehicle, which user is operating the vehicle, where the driver or other user is looking (e.g., whether they are talking to a passenger), whether there are pedestrians nearby, whether there are billboards or store signs next to the road or vehicle, etc.

In some embodiments, the accessories 108a-108c may also include any vehicle utility or device that is controllable by a user. Examples of these accessories include adjustable seats, sun roof, side mirrors, rear-view mirror, air conditioner, power windows, or other controllable features of the vehicle 102.

It should be noted that some accessories may only output data, some accessories may only receive control signals to manipulate the accessory, and some accessories may input and output data. For example, a speedometer may only output the current speed of the vehicle; a power window may only receive control signals to move the window up or down but not return any information to the head unit; and the navigation system may receive a request for a destination and also return a suggested travel route to the destination. It should be further noted that these examples are non-exhaustive and other types of accessories may also be employed.

The head unit 104 can communicate with the accessories 108a-108c via an accessory communication network 106. The accessory communication network 106 is configured to couple the accessories 108a-108c with the head unit 104 to transmit content/data between the accessories 108a-108c and the head unit 104. The information communicated between devices may include current accessory status or data, accessory control data, video data, voice data, image data, text data, or other types of content, data, or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short-range wireless communication network, such as personal area networks utilizing Bluetooth Low Energy protocols, or any other type of network.

In some other embodiments, the head unit 104 may act as an intermediate device that facilitates communication between the mobile device 114 and the accessories 108a-108c. In this way, the head unit 104 can act as a gateway between the mobile device 114 and the accessories 108a-108c to provide authentication and authorization for permitting or restricting the control of accessories 108a-108c and the transfer of accessory information, which can enable a user to access information from or control accessories 108a-108c via mobile device 114.

Figure 2:
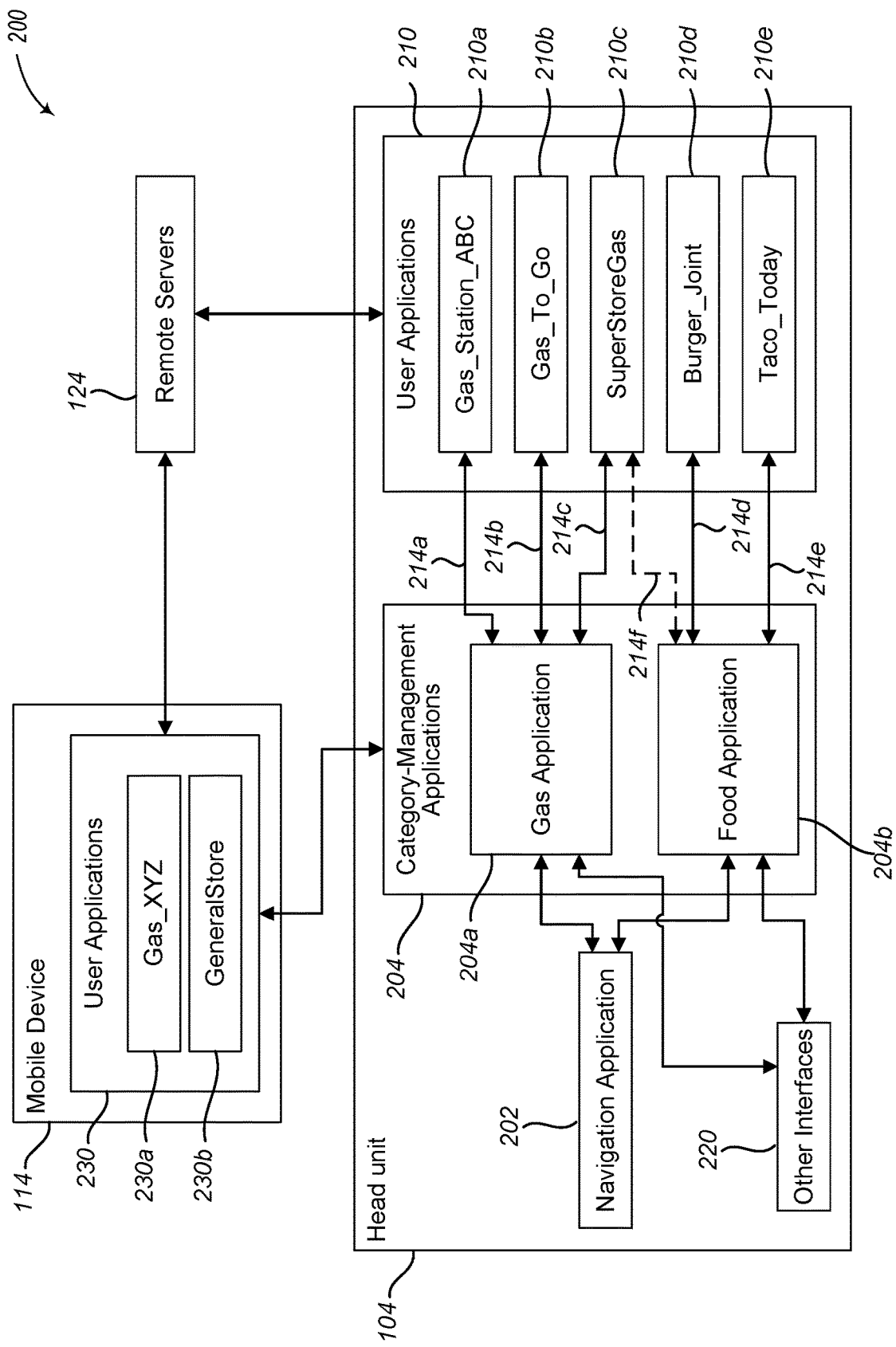
FIG. 2 shows a use case example of a head unit's utilization of category-management applications and user applications in accordance with embodiments described herein.

FIG. 2 shows a use case example of a head unit's utilization of category-management applications and user applications in accordance with embodiments described here. Example 200 includes a head unit 104 and a remote server 124, and optionally a mobile device 114, similar to what is described above in conjunction with FIG. 1.

The head unit 104 has stored thereon a navigation application 202, a plurality of category-management applications 204, and a plurality of user applications 210. In various embodiments, the navigation application 202, the category-management applications 204, or the user applications 210 may be considered as accessories of the vehicle. Although not illustrated, the head unit may also store system applications, such as a camera application, other map applications, safety applications, etc., that may be built into the head unit by a manufacturer. In another arrangement, one or more of the navigation application 202, category-management applications 204, user applications 210, or system applications may be installed or stored on other devices and selectively presented on the head unit, such as for interaction with a user.

The navigation application 202 is an application that obtains GPS or other location data and outputs visual or audible content to a user of the head unit 104, such as a map or directions. Accordingly, the navigation application 202 can display a map with the vehicle's current location and optionally, a route to a destination. The navigation application 202 may also display other content to the user. For example, the navigation application 202 may overlay and display icons representative of the location of parks, stores, restaurants, etc. or external conditions, such as weather or traffic. In other embodiments, the navigation application 202 may also display other content received from the category-management applications 204, such as coupons, advertisements, alerts, or other types of content. This additional content may be displayed to a user via a banner, window, or scrolling text or presented through some other audiovisual interface.

The category-management applications 204 are applications that interact with one or more related user applications 210, as well as the navigation application 202. In general, a category-management application 204 serves as an interface for its corresponding user applications 210 so that the user applications 210 can execute in the background without requiring direct user interaction. This process enables the category-management application 204 to aggregate information from its corresponding user applications 210 for efficient presentation to a user. In this example, the category-management applications 204 include a gas application 204a and a food application 204b. Embodiments, however, are not so limited and other types of category-management applications 204 may be used, such as those related to financial institutions, retail establishments, parks and recreation, repair shops, games, safety, etc.

The user applications 210 are applications for a particular store, service, product, business, shop, station, park, game, etc. These applications are typically considered stand-alone applications in that they can be accessed directly by a user via a graphical user interface and typically execute in the foreground of the computing system. In embodiments described herein, however, the user applications 210 execute in the background without direct interaction with the user. Rather, the user interacts with the head unit 104 via the navigation application 202, or optionally the category-management applications 204 or even other interfaces 220, which reduces the interactions between the user and the head unit 104 and subsequently reduces the distractions to the user. Therefore, the category-management applications 204 and the navigation application 202 work together act as an intermediary between the user and the user applications to present content from or for a user application 210 without the user directly interacting with the user applications 210. As a result, the user is not distracted by scrolling through many different windows or visual interfaces to access a user application 210 or directly interacting with the user application 210 itself.

Alternatively, the category-management applications 204 may provide the user applications 210 a display area that can be used directly for user interaction. In this mode, however, the head unit 104 presents the look and feel of using a single application, and the user is unaware of the user applications 210 that are effectively service modules to the category-management application 204. For example, the gas application 204a may show the user the look and feel of the gas_station_ABC application 210a, but the actual payment interface may be provided by the gas_station_ABC application 210a itself. In either case, the user is unaware of the plurality of user applications 210 or does not select them directly.

In one embodiment, the user application 210 that is presented to the user through the category-management application 204 may depend on one or more factors, like proximity to the vehicle or prior user activity. For example, the gas_station_ABC application 210a may be selected as the service module to be presented to the user through the gas application 204a if a gas station associated with this application 210a is closer to the vehicle than a different gas station. As another example, the selection of a user application 210 under this arrangement may stem from the user's repeated visits to an establishment associated with that user application 210. In this case, various machine-learning ("ML") models, including those onboard or remote to the vehicle may assist in this selection. Factors other than proximity or previous user actions—such as type of vehicle, vehicle parameters, settings, or values, or events at the establishments associated with the user applications 210—may drive the selection of a user application 210 for this form of presentation.

No matter how the category-management applications 204 minimize interactions between a user and the head unit 104, one or more user applications 210 may be assigned or linked to one or more category-management applications 204 as part of that process. This connection may be done automatically or manually (or both). For example, if a gas user application 210 is installed, the head unit 104 (or some other device) may automatically assign the gas user application 210 to a gas category-management application 204. A user may also perform this step manually and can override any automatic linking done by the system. In addition, a user application 210 may be assigned to multiple category-management applications 204, such as if the entity related to that user application offers goods or services that are associated with the themes of two separate category-management applications 204.

The user applications 210 can provide a variety of content (including information) for presentation to a user of the head unit 104, such as nearest store locations, sale items, coupons, advertisements, contact information, hours of operation, prices, etc. In this example, the user applications 210 include a Gas_Station_ABC application 210a, a Gas_To_Go application 210b, a SuperStoreGas application 210c, a Burger_Joint application 210d, and a Taco_Today application 210e. These examples are for illustrative purposes and are not to be construed as limiting.

In various embodiments, the user applications 210 communicate with one or more remote servers 124 to obtain content. For example, the Gas_Station_ABC application 210a may communicate with a corresponding remote server 124 to obtain updated information on the locations of the Gas_Station_ABC service stations or a nearest service station given some location information (e.g., current location of the vehicle, a destination of the vehicle, a home town of an owner of the vehicle, etc.). In some embodiments, the user applications 210 may communicate with the same remote server 124, but in other embodiments, the user applications 210 communicate with their own separate respective remote servers 124.

The user applications 210 communicate with the category-management applications 204 via links 214a-214f, which represent interprocess communications. For example, the Gas_Station_ABC application 210a, the Gas_To_Go application 210b, and the SuperStoreGas application 210c communicate with gas application 204a via links 214a-214c, respectively, and the Burger_Joint application 210d and the Taco_Today application 210e communicate with food application 204b via links 214d and 214e, respectively. In various embodiments, each user application 210 communicates with a single category-management application 204. In other embodiments, one or more user applications 210 may communicate with multiple category-management applications 204. For example, the SuperStoreGas application 210c may communicate with the gas application 204a via link 214c and optionally with the food application 204b via link 214f.

In various embodiments, links 214a-214e may be pipes, sockets, message busses, or other communication channels, protocols, interfaces, etc. In various embodiments, the links 214a-214f between the respective category-management applications 204 and the user applications 210 are established upon installation of the user application 210 onto the head unit 104 (or some other device). In some embodiments, the developer or an administrator of the user applications 210 selects which link 214 to communicate with a specific category-management application 204. For example, the developer of a gas-related user application 210 selects a link 214 to the gas application 204a, whereas a developer of a food-related user application 210 selects a link 214 to the food application 204b. In some other embodiments, the user of the head unit 104 is enabled to select the links 214 between the user applications 210 and the category-management applications 204, such as via a graphical user interface. This functionality allows the user to dynamically change with which user applications 210 each category-management application 204 interacts. In other cases, the system may automatically select the link 214, which can be based on information in the software package of the user application 210. In some embodiments, the user applications 210 may not run as distinct processes but may be modules, such as shared libraries, scripts, or web services, that are linked to a category-management application 204 or otherwise loaded at runtime.

As mentioned above, the user may interact with the user applications 210 via the navigation application 202 or some other interface 220. As one example, a user can touch a soft button being displayed by the navigation application 202 to access user-application content. For example, the navigation application 202 may present a "gas" button to enable a user to retrieve content from gas user applications 210. Continuing with this example, the navigation application 202 sends a request to the gas application 204a for the location of gas stations within a certain range of the current location of the vehicle. In this example, the range is a ten-mile radius with the current location of the vehicle at roughly the center of the radius. In various embodiments, the request includes GPS coordinates or other location information with respect to the vehicle. The gas application 204a sends a request to each of the Gas_Station_ABC application 210a, the Gas_To_Go application 210b, and the SuperStoreGas application 210c via links 214a-214c to obtain information regarding gas stations within the ten-mile radius of the vehicle's current location—although such a request may be sent to one or more other applications based on user preferences or activity history.

The Gas_Station_ABC application 210a, the Gas_To_Go application 210b, and the SuperStoreGas application 210c execute in the background to fulfill the request, which, in some embodiments, may include communicating with one or more remote servers 124. In response to obtaining the requested information, the Gas_Station_ABC application 210a, the Gas_To_Go application 210b, and the SuperStoreGas application 210c provide the requested information to the gas application 204a via links 214a-214c. In this example, the requested information may be GPS coordinates and a logo for the corresponding gas station. The gas application 204a aggregates the received information and provides it to the navigation application 202, where the navigation application 202 modifies or augments a displayed map to include the gas-station logos at the respective locations.

In another arrangement, a user may initiate a request directly through a category-management application 204, as opposed to launching it through the navigation application 202. For example, the user may first select the gas application 204a, which can retrieve and aggregate the appropriate location information from the Gas_Station_ABC application 210a, the Gas_To_Go application 210b, and the SuperStoreGas application 210c. In turn, the gas application 204a can share this content with the navigation application 202, which can cause the logos to be presented on its user interface, as described above. Moreover, the gas application 204a can discard content that may not be useful, before sharing it with the navigation application 202. For example, the location of the closest gas station affiliated with the Gas_Station_ABC application 210a may be on the outer boundary of the range (or radius) set by the vehicle's current location, and the vehicle is presently moving away from that location. In this case, the gas application 204a could filter out this content, preventing its display via the navigation application 202.

Although the above examples discuss the category-management application 204 as accessing nearest store-location information from the user applications 210, embodiments are not so limited. In other embodiments, a user application 210 may provide information specific to the user. For example, when the user puts the vehicle into park, the navigation application 202 may provide location information to the gas application 204a and the food application 204b. The gas application 204a and the food application 204b can provide an instruction to the respective user applications 210 requesting nearest store information. When the user applications 210 respond with the nearest store locations, the category-management applications 204 can determine if a nearest store location matches the current location of the vehicle.

For this example, assume the location received from the Gas_Station_ABC application 210a matches the current location of the vehicle, which indicates that the vehicle is at a particular Gas_Station_ABC station. In response, the gas application 204a can request additional information from the Gas_Station_ABC application 210a for that particular station. In this example, the Gas_Station_ABC application 210a may respond with certain content, such as gas prices, number of pumps, coupons, a rewards account number, current rewards points, etc. The gas application 204a then presents the received content to a user, such as via the navigation application 202 or some other interface of the head unit 104 or the other interfaces 220. In one non-limiting example, the gas application 204a may display a coupon or other content for that particular station or output audio content via a speaker indicating a currently available pump number and the current rewards balance for that station.

In some other embodiments, the category-management applications 204 can provide other information to the user applications 210, so that the user applications 210 can perform other actions. For example, the category-management applications can obtain a currently entered destination, route, or estimated time of arrival to one or more of the user applications 210. In at least one embodiment, each user application 210 registers with one or more of the category-management applications 210 and notifies the category-management application 210 of the information that that user application 210 is to receive. In this way, a user application 210 can provide additional information to the user based on where the user is going. For example, if the user enters a destination of Hardware_Store_MNO into the navigation application. The navigation application can provide this information to a category-management application, which can then forward the information to a user Hardware_Store_MNO application. The Hardware_Store_MNO application can then respond with a coupon or hours of operation prior to the user arriving at Hardware_Store_MNO. This information can also be made available to a companion application running on the mobile device, allowing a user to see the coupon in the car but be able to use it inside the store.

As another example, the user may interact with the category-management applications 204 via other interfaces 220, such as via a voice-activated interface. In one example scenario, a user of the head unit 104 may speak verbal commands that include food ordering instructions, such as "give me a biggie with a side of wedges." The other interfaces 220 utilizes voice-recognition techniques to obtain the text of the user's instructions. These instructions are then provided to the gas application 204a and the food application 204b. The gas application 204a sends the instructions to the Gas_Station_ABC application 210a, the Gas_To_Go application 210b, and the SuperStoreGas application 210c and the food application 204b sends the instructions to the Burger_Joint application 210d and the Taco_Today application 210e. If any of the user applications 210 recognize the instructions, then they can respond to the corresponding category-management application 204 indicating that the instructions are received and acknowledged.

In this example, the Burger_Joint application 210d may recognize the instructions as a request to pre-order a "Biggie Meal" with a side order of french fries. The Burger_Joint application 210d can send an acknowledgement request back to the food application 204b, which can output a visible confirmation request via the navigation application 202 or some other interface of the head unit 104 or an audible confirmation request via the other interfaces 220. If the user acknowledges the request, the food application 204b responds to the Burger_Joint application 210d with the acknowledgement. The Burger_Joint application 210d can then place the order by communicating with the remote server 124.

In some embodiments, the category-management applications 204 may include additional functionality that bypasses or does not utilize a user application 210. For example, the food application 204b may include functionality to enable the head unit users to order food from local "mom and pop" restaurants that do not have a user application. In another arrangement, a category-management application 204 may be configured to process the user requests and determine which user application 210 should receive the request. This alternative may reduce the number of signal exchanges within the system. In either case, the category-management applications 204 and the user applications 210 may be configured to rely on local or remote ML models for processing the user requests, or such functionality may be embedded within them.

As yet another example, one of the category-management applications 204 may be a safety-management application (not illustrated). This safety application may communicate with the remote server 124 to provide or obtain various safety information. For example, the safety-management application may receive an amber alert from the remote server 124. In response, the safety-management application may display or audibly present the alert to the user. Likewise, the safety management application may communicate with one or more accessories on the vehicle to obtain additional information. For example, the safety-management application may collect images from a forward-facing camera. The safety-management application can then analyze the images for license-plate numbers of nearby vehicles to compare against a target license-plate number provided in the amber alert. If there is a match, the safety-management application obtains the current location of the vehicle from the navigation application 202 and provides it to the remote server 124. In some embodiments, the presence of this safety-management application may be completely invisible to the user, with no visual or audio output indicating that it is continuously working in the background.

In various embodiments, the mobile device 114 may also store and execute user applications 230. The user applications 230 are similar to the user applications 210 on the head unit 104. In some embodiments, the user applications 230 on the mobile device 114 may include some of the same user applications 210 on the head unit 104. In other embodiments, the user applications 230 on the mobile device 114 may include different user applications than the head unit 104. In this illustration, the mobile device 114 includes a Gas_XYZ application 230a and a GeneralStoreapplication 230b, which are separate and different from the user applications 210 on the head unit 104.

The category-management applications 204 access and communicate with the user applications 230 on the mobile device 114 similar to what is described above for communicating with the user applications 210 on the head unit 104 to obtain and select content to present to the user via the navigation application 202. The use of such user applications 230 on the mobile device 114 enables the head unit 104 to perform embodiments described herein without having the head unit 104 download and store user applications 210 on the head unit 104, which can save computing resources, as well as the time it would take a user select such user applications for downloading onto the head unit 104.

As an option, the user applications 230 may be projected from the mobile device 114 to the head unit 104, enabling the user to interact with them via the head unit 104. Any category-management applications installed on the mobile device 114 may also be projected to the head unit 104. The interactions described above may also apply to this configuration, although at least some of the processing may occur on the mobile device 114.

The operation of certain aspects of the disclosure will now be described with respect to FIGS. 3 and 4. In at least one of various embodiments, processes 300 and 400 described in conjunction with FIGS. 3 and 4, respectively, may be implemented by or executed on one or more computing devices, such as head unit 104. These processes are not necessarily limited to the chronological orders shown here and may be executed without adhering to all the steps described here or with steps that are beyond those in the diagrams. To be clear, processes 300 and 400 are merely examples of flows that may be applicable to or adopt the principles described above.

Process 300 begins, after a start block, at block 302, where the head unit stores one or more category-management applications and user applications. In various embodiments, the category-management applications are pre-installed on the head unit, such as at the time of manufacture. One or more of the user applications may also be pre-installed on the head unit, or they may be downloaded to the head unit by the user, such as via a cellular network connection to a server hosting an application store or via a mobile device of the user. Of course, many other configurations may apply, too, including installation of the category-management applications and user applications on other computing devices.

Process 300 proceeds to block 304, where the category-management application receives a request to interact with one of the user applications. In some embodiments, to trigger this interaction, a navigation application receives the request from a user of the head unit, such as via the user activating a button on a graphical user interface, and provides it to the category-management application. In other embodiments, the category-management application receives the request directly from the user or from another input interface, such as an audio interface that captures a voice command provided by the user. In yet other embodiments, the request may be from a user application. For example, a safety application may receive an alert from a remote server and send a request to the category-management application for the category-management application to obtain information from other accessories of the vehicle. In some embodiments, the request may be from another accessory of the vehicle, such as from a vehicle computer when the vehicle is put into park.

In some embodiments, the request may specifically identify the user application. For example, if the navigation application is presenting a map to the user with icons for restaurants and the user activates an icon for Taco_Today, the navigation application provides a request to the category-management application for information from the Taco_Today user application.

In other embodiments, the request may indicate a desire for content or information without identifying a specific user application. Continuing the previous example, if the user activates a button for food in general (whether through the navigation application or directly through the category-management application), the category-management application may identify a nearest restaurant associated with one of the stored user applications and select that user application to process a request for current operating hours. As another example, if the navigation application is presenting a map without icons for restaurants and the user activates the food button, the category-management application can identify and select a user application associated with food to process a request the nearest location.

Process 300 continues to block 306, where the category-management application provides the request to the user application corresponding to the request. As mentioned herein, this request is for some type of content, which may include coordinates or an address for a nearest store location, hours of operation, coupons, daily information, rewards program information, automatic ordering information, or other information.

The user application then executes in the background to fulfill the request. In some embodiments, the user application queries a database, accesses a web service, or performs other actions to obtain the requested content. For example, the user application may query a database stored locally on the head unit, or it may communicate with a remote server, such as remote server 124 in FIG. 1, to obtain the requested content. In other embodiments, the user application may send the request or associated information to the remote server to fulfill the request. For example, if the request is to order a pizza from a particular pizzeria, the user application sends the order request to a remote server of the pizzeria to place the order. In some embodiments, the category-management application and the user application may provide one or more communications back and forth to fulfill the request.

Process 300 proceeds next to block 308, where the category-management application receives content from the user application in response to the request. For example, with the example of ordering a pizza, this content may be an acknowledgement that the pizza order was successfully submitted. In yet other embodiments, the content may be presented to the user.

Process 300 continues next at block 310, where content associated with the response information is presented to the user of the head unit. In various embodiments, the category-management application provides the content to a navigation application for presentation to the user. In other embodiments, the category-management application itself employs a graphic user interface on the display device of the head unit to present the content to the user.

In some embodiments, the content is provided to the user via a banner or display window on the display device of the head unit. In other embodiments, one or more content items are selected based on the response and then presented to the user. For example, if the content is an address for a nearest restaurant, the category-management application may provide the address to a navigation application, which selects and displays on a map a pin icon (i.e., the content) representing the address.

In various embodiments, the content is visual content that is displayed to the user via a display device on the head unit (or some other display device within the vehicle). In other embodiments, the content is audio content that is output to the user via a speaker. In yet another embodiment, the content may be provided to a mobile device of the user, such that the content is viewable on the mobile device.

In some embodiments, the content that is presented to the user is prioritized or ranked when provided to the user. For example, the head unit may display a plurality of content in a prioritized list with the highest priority content on top and the lowest priority content on the bottom. The priority of the content may be determined based on factors associated with the user of the vehicle, the current driving conditions, or some combination thereof.

In some embodiments, content obtained by one category-management application may have a higher priority than content obtained by another category-management application. In at least one embodiment, the user may select or set the priority of the content from the different category-management applications. For example, content from a gas category-management application may be set to have a higher priority than content from a food category-management application.

In other embodiments, the current driving conditions may dictate the priority of the content. For example, if there is currently heavy traffic, then food-related content may be given a lower priority, while traffic updates or route instructions may be given a higher priority. The current driving conditions may be determined based on the current speed of the vehicle compared to the posted speed limit (e.g., based on a look-up in a database for the vehicle's current location or using a forward-facing camera and image-recognition techniques to identify speed-limit signs), the current weather (e.g., based on tire slippage or use of a weather application), the amount of braking being done by the driver, vehicle-to-vehicle communications, use of LiDAR or other proximity sensors, etc., or some combination thereof.

In some other embodiments, the priority of the content may be based on a timeline factor. For example, the highest priority content is associated with a factor the user or vehicle may experience first, and the second highest priority content is associated with a factor the user of vehicle may experience next, and so on. As such, the lowest priority content is associated with a factor the user or vehicle may experience at a maximum time in the future. In this way, the content is presented to the user in an order in matching the expected chronology of the factors.

For example, assume the plurality of content includes an advertisement for a restaurant 1 km away, a route instruction to turn left in 2 km, a safety recall notification, and a notification for an oil change that is due in 500 km. In this example, the advertisement may have a highest priority because it is likely the next factor that the user is going to experience, followed by the route instruction, safety recall, and then the oil change notification. Once the vehicle passes the restaurant, then that content may be removed from the list, and the priorities of the other content can be adjusted. If the user continues to neglect the safety recall, then its priority may be heightened as time goes on. Conversely, if the user delays the oil change, then its priority may be lowered for a threshold amount of time and possibly increased after this period expires.

The prioritized content can include the content obtained by the category-management applications, maintenance notifications, incoming phone calls or other communication messages, radio-related information (e.g., radio station, song title, and artist), advertisements, safety information, etc. The different types of content may be assigned a priority by the user or an administrator or automatically by the system. These priorities may change over time based on the current driving conditions, the user's preferences (e.g., if the user quickly dismisses a maintenance notification but follows an advertisement to a restaurant), or other factors.

In at least one embodiment, the priority changes may be based on a current distraction profile for the driver. For example, if the driver is distracted (e.g., in heavy traffic, during poor weather conditions, with other people in the vehicle, etc.), safety-related content may be given a higher priority in comparison to that of advertisements. In this way, content that has a priority that exceeds a threshold value for the current distraction profile is presented to the user. As the current distraction profile changes, the presentation threshold may change, and lower priority content may be presented to the user. After block 310, process 300 terminates or otherwise returns to a calling process to perform other actions.

Although process 300 describes employing a single category-management application and selecting a single user application, embodiments are not so limited. Rather, in some embodiments, one or more of a plurality of category-management may interact with one or more user applications, which is discussed in more detail below in conjunction with FIG. 4.

Figure 4:
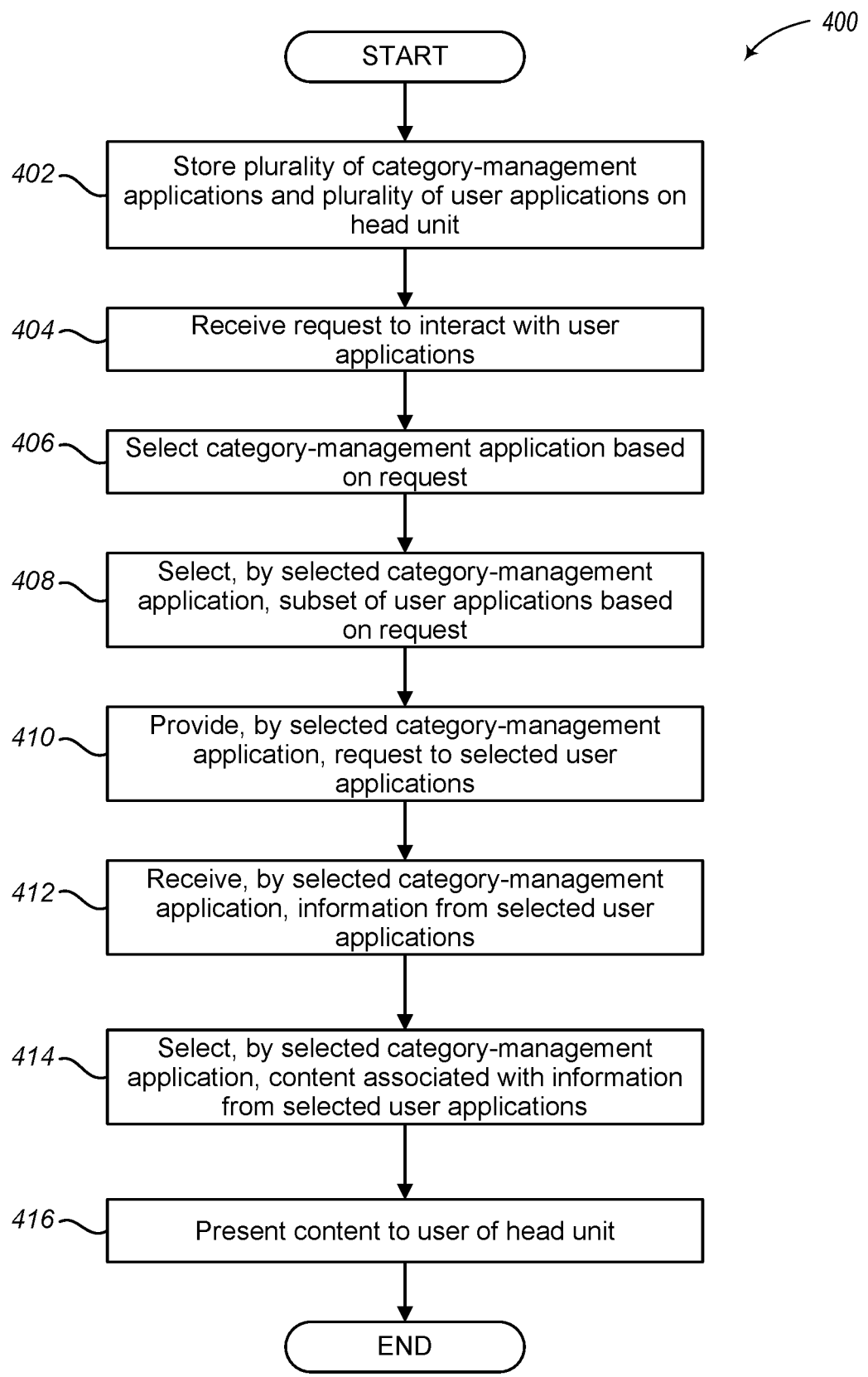
FIG. 4 illustrates a logical flow diagram generally showing one embodiment of an alternative process for utilizing multiple category-management applications to interact with multiple user applications to present content to a user in accordance with embodiments described herein.

FIG. 4 illustrates a logical flow diagram generally showing one embodiment of an alternative process for utilizing multiple category-management applications to interact with multiple user applications to present content to a user in accordance with embodiments described herein.

Process 400 begins, after a start block, at block 402, where a plurality of category-management applications, a plurality of user applications, and a navigation application are stored on a head unit or some other device. In various embodiments, block 402 employs embodiments of block 302 in FIG. 3 to store the applications on the head unit or other device.

Process 400 proceeds to block 404, where a request to interact with one or more user applications is received. In various embodiments, block 404 employs embodiments of block 304 in FIG. 3 to receive a request to interact with a user application.

Process 400 continues at block 406, where one or more category-management applications are selected based on the request. As discussed above, the request may itself identify a particular user application. Accordingly, the category-management applications that interact with that particular user application are selected. In other embodiments, the request may itself identify a user application category or a particular category-management application. For example, if the request is food, then the corresponding category-management food application is selected.

In various embodiments, if the request is input via a navigation application, the navigation application may select the category-management applications. In other embodiments, the navigation application may provide the request to another application, such as an administrator application that manages the category-management applications, to select the category-management applications. As another option, the user may directly select the category-management applications.

Process 400 proceeds next to block 408, where the selected category-management applications select at least some of the user applications based on the request. In some embodiments, only one user application is selected. In other embodiments, multiple (but not all) user applications are selected. In yet other embodiments, all the user applications are selected.

The selected user applications may be identified in the request or selected by the category-management applications. For example, if the request is related to food, the food category-management application can select user applications associated with food that it can interact with (e.g., via links 214 or via mobile device 114 in FIG. 2). In some embodiments, a category-management application maintains a data structure to identify which user applications to select for which requests.

Process 400 continues next at block 410, where the selected category-management applications provide the request to the selected user applications. In various embodiments, block 410 employs embodiments of block 306 to provide the request to the selected user applications.

Process 400 proceeds to block 412, where the selected category-management applications receive content from the selected user applications in response to the request. In various embodiments, block 412 may perform embodiments of block 308 for the category-management applications to receive the responses from the user applications, although multiple category-management applications may be receiving responses from multiple user applications.

Process 400 continues at block 414, where the selected category-management applications select content associated with the responses for presentation to the user. In some embodiments, the selected category-management application selects content for the responses from the selected user applications. In other embodiments, the selected category-management applications select content for a subset of the responses. In one example, the category-management gas application may select content for the closest single gas station to present to the user, even though it may have received content from five different user gas applications. Similarly, as another example, the location of the closest gas station that is in the user's preconfigured list of preferred gas stations may be presented.

In various embodiments, a subset of the selected category-management applications may select content. For example, each selected category-management application may receive nearest-store locations from each user application, but only the category-management application that identifies the single closest store to the vehicle may select the content to present to the user.

In some embodiments, the category-management applications coordinate the selection of the content together. In other embodiments, the category-management applications select content separately from each other. In at least one such embodiment, the navigation application or some other administrative application can aggregate the selected content and determine what content to present to the user.

Process 400 proceeds next to block 416, where the content is presented to the user. In various embodiments, block 416 performs embodiments of block 310 in FIG. 3 to present the content to a user of the head unit. In some embodiments, content from multiple user applications is concurrently presented to the user. After block 416, process 400 terminates or returns to a calling process to perform other actions.

Figure 3:
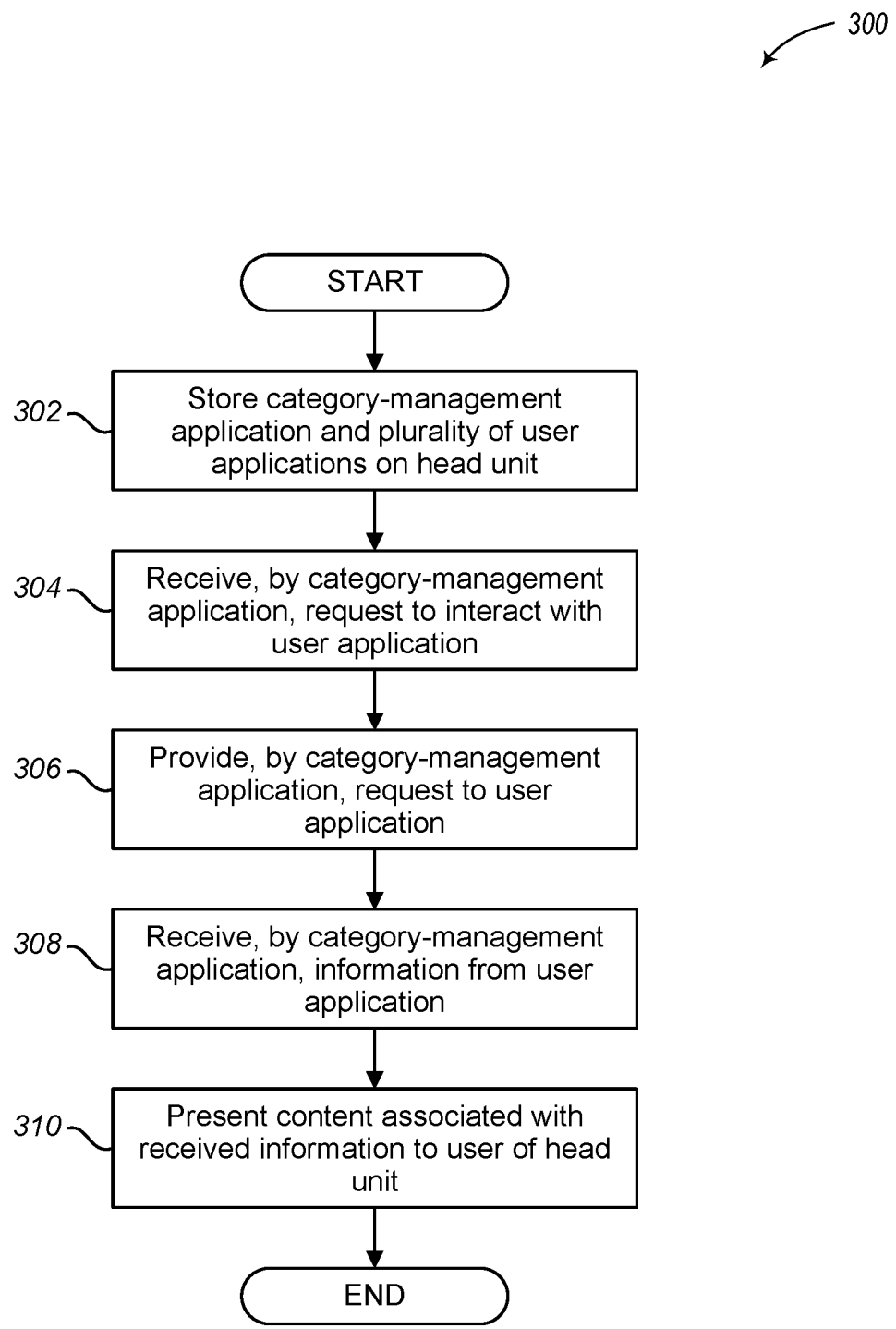
FIG. 3 illustrates a logical flow diagram generally showing one embodiment of an overview process for utilizing a category-management application to interact with a user application to present content to a user of a vehicle in accordance with embodiments described herein.

Although process 300 in FIG. 3 and process 400 in FIG. 4 describe the user applications as being stored on and executed by the head unit, embodiments are not so limited. Rather, as discussed herein, one or more of the user applications may be stored on and executed by a mobile device of the user (e.g., mobile device 114 in FIG. 2) or some other device, whether onboard the vehicle or remote to it. In these embodiments, the category-management application utilizes a network interface to communicate with the user applications on the mobile device or other device.

Figure 5:
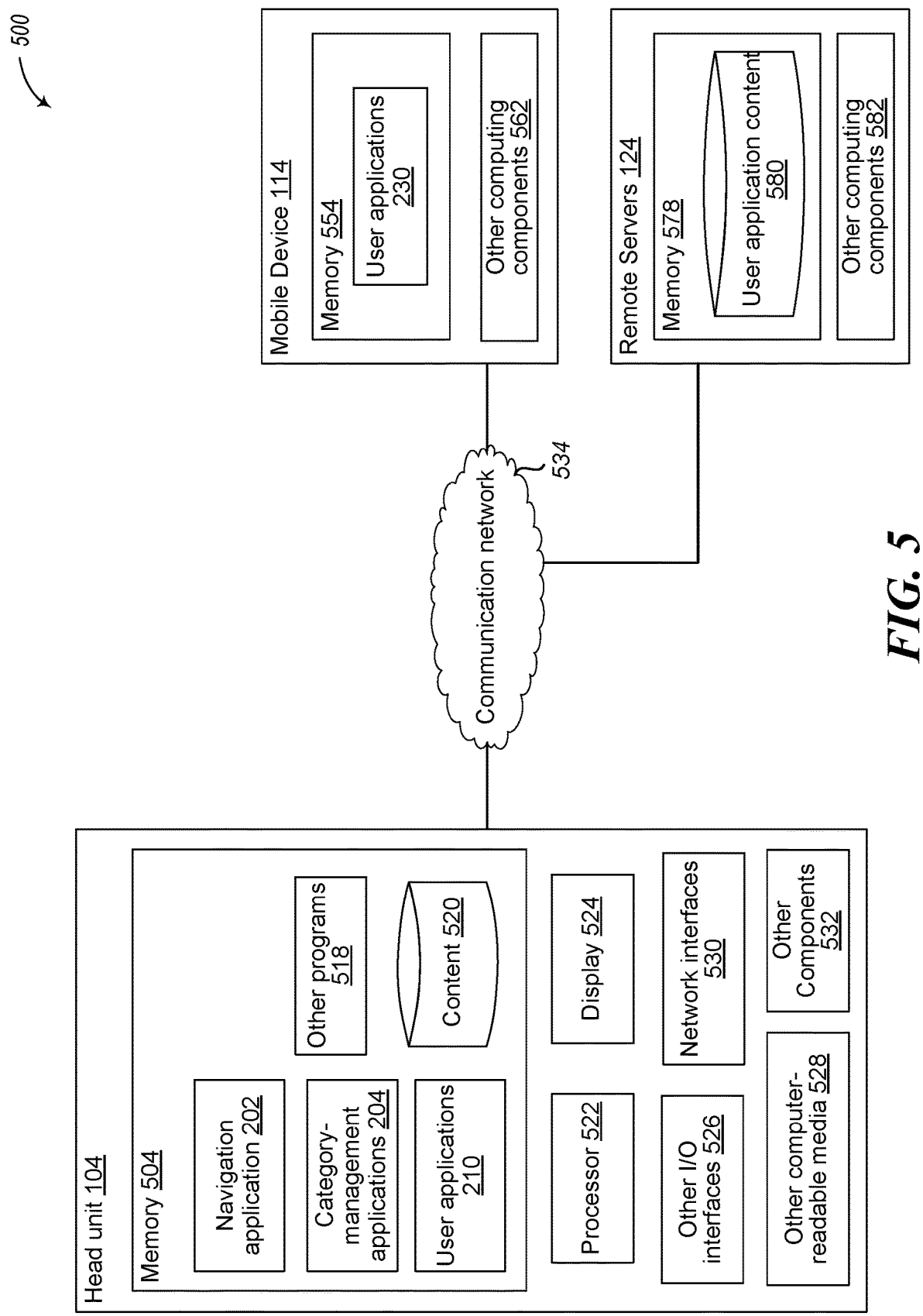
FIG. 5 shows a system diagram that describes one implementation of computing systems for implementing embodiments described herein.

FIG. 5 shows a system diagram that describes one implementation of computing systems for implementing embodiments described herein. (Other systems may also apply to the concepts presented above.) System 500 includes head unit 104 and optionally, a mobile device 114 or one or more remote servers 124.

The head unit 104 is a computing device that can perform functionality described herein for managing and aggregating results from user applications to select content to display to a user of the head unit 104. One or more special-purpose computing systems may be used to implement the head unit 104. Accordingly, various embodiments described herein may be implemented in software, hardware, firmware, or in some combination thereof. The head unit 104 includes memory 504, one or more processors 522, display 524, input/output (I/O) interfaces 526, other computer-readable media 528, network interface 530, and other components 532.

Processor 522 includes one or more processing devices that execute computer instructions to perform actions, including at least some embodiments described herein. In various embodiments, the processor 522 may include one or more central processing units (CPUs), programmable logic, or other processing circuitry.

Memory 504 may include one or more various types of non-volatile and/or volatile storage technologies. Examples of memory 504 include flash memory, hard disk drives, optical drives, solid-state drives, various types of random-access memory (RAM), various types of read-only memory (ROM), other computer-readable storage media (also referred to as processor-readable storage media), or other memory technologies, or any combination thereof. Memory 504 may be utilized to store information, including computer-readable instructions that are utilized by processor 522 to perform actions, including at least some embodiments described herein.

Memory 504 may have stored thereon various modules, such as a navigation application 202, one or more category-management applications 204, and one or more user applications 210. The navigation application 202 provides functionality to present a map or other content to a user of the head unit 104, such as via display 524, other components 532, or input/output interfaces 116, 126 in FIG. 1. Each category-management application 204 provides functionality to communicate with one or more user applications 210, or user applications 230 on the mobile device 114, to request content, aggregate responses, select content, and coordinate the presentation of the content to the user, such as via the navigation application 202. A user application 210 can be an executable program developed for a particular store, service, product, business, shop, station, etc. In some embodiments, the user applications 210 request associated content from another computing device, such as remote servers 124.

Memory 504 may also store other programs 518 and other content 520. Other programs 518 may include operating systems, user applications, or other computer programs. Content 520 may include visual, audio, or tactile content to provide to the user, which may or may not be accessible to the user applications 210.

Display 524 is a display device capable of rendering content to a user. The display 524 may be a liquid-crystal display, light-emitting diode, or other type of display device and may include a touch sensitive screen capable of receiving inputs from a user's hand, stylus, or other object.

I/O interfaces 526 may include interfaces for various other input or output devices, such as audio interfaces, other video interfaces, USB interfaces, physical buttons, keyboards, or the like.

Other computer-readable media 528 may include other types of stationary or removable computer-readable media, such as removable flash drives, external hard drives, or the like.

Network interfaces 530 are configured to communicate with other computing devices, such as the mobile device 114 or the remote servers 124, via a communication network 534. Network interfaces 530 include transmitters and receivers (not illustrated) to send and receive data as described herein. The communication network 534 may include the communication network 122 or the mobile device communication network 120 of FIG. 1.

The mobile device 114 is a computing device that is separate from the head unit 104, such as a smart phone, tablet computer, laptop computer, etc. One or more special-purpose computing systems may be used to implement the mobile device 114. Accordingly, various embodiments described herein may be implemented in software, hardware, firmware, or in some combination thereof.

Briefly, the mobile device 114 includes a memory 554 and other computing components 562. The memory 554 may include one or more various types of non-volatile and/or volatile storage technologies to store information and computer-readable instructions, similar to memory 504. The memory 554 may store one or more user applications 230. The user applications 230 are similar to the user applications 210 on the head unit 104 and are accessible to the category-management applications 204 on the head unit 104. The memory 554 may also store other programs and content.

The other computing components 562 include one or more processors, I/O interfaces, network interface, and other computing components and resources, which are known to those skilled in the art and are not discussed here for brevity.

The remote servers 124 include one or more computing devices that are remote from the head unit 104. These remote servers 124 may be host devices, backend devices, or other servers that provide content or application support to the user applications 210 or 230. One or more special-purpose computing systems may be used to implement each remote server 124. Accordingly, various embodiments described herein may be implemented in software, hardware, firmware, or in some combination thereof.

Briefly, each remote server 124 includes a memory 578 and other computing components 582. The memory 578 may include one or more various types of non-volatile and/or volatile storage technologies to store information and computer-readable instructions, similar to memory 504. The memory 578 may store user application content 580, which can be provided to the head unit 104 or the mobile device 114 upon request from a user application 210 or 230, respectively. The memory 578 may also store other programs and content. The other computing components 582 include one or more processors, I/O interfaces, network interface, and other computing components and resources, which are known to those skilled in the art and are not discussed here for brevity.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A head unit of a vehicle, comprising:
a memory that is configured to store computer instructions, a navigation application, a plurality of user applications, and plurality of first category-management applications, wherein the plurality of first category-management applications includes a first category-management application configured to communicate with a first subset of the plurality of user applications and a second category-management application configured to communicate with a second subset of the plurality of user applications, wherein the plurality of user applications are configured as background processes to execute without direct interaction with a user of the vehicle, and wherein the first category-management application is separate from the second category-management application and the first subset of user applications includes at least one user application that is different from the second subset of user applications;
an output interface that is configured to present visual content to the user of the vehicle;
one or more processors that are configured to execute the computer instructions to carry out the following:
select the first category-management application from the plurality of category-management applications based on a request for content received through the navigation application;
employ the first category-management application to select a plurality of first user applications from the first subset of user applications based on the request;
provide, by the first category-management application, the request to the plurality of first user applications;
receive, by the first category-management application and from the plurality of first user applications, a plurality of first content in response to the request;
select, by the first category-management application, a first subset of the plurality of first content to provide to the navigation application based on the request;
select the second category-management application from the plurality of category-management applications based on the request;
employ the second category-management application to select a plurality of second user applications from the second subset of user applications based on the request;
provide, by the second category-management application, the request to the plurality of second user applications;
receive, by the second category-management application and from the plurality of second user applications, a plurality of second content in response to the request;
select, by the second category-management application, a second subset of the plurality of first content to provide to the navigation application based on the request;
provide, by the first category-management application, the first subset of content to the navigation application and, by the second category-management application, the second subset of content to the navigation application;
aggregate, by the navigation application, the first subset of content with the second subset of content into aggregated content based on the request; and
display via the output interface the aggregated content.

2. The head unit of claim 1, wherein the processor is configured to provide the request to the plurality of first user applications and to the plurality of second user applications by executing further computer instructions to:
  provide an instruction to the plurality of first user applications and to the plurality of second user applications to cause the plurality of first user applications and the plurality of second user applications to execute commands to fulfill the request without direct user interaction with the plurality of first user applications or the plurality of second user applications.

3. The head unit of claim 1, wherein the processor is configured to execute further computer instructions to:
  receive, at the first or second category-management application, a current location of the vehicle from the navigation application.

4. The head unit of claim 1, wherein the processor is configured to execute further computer instructions to:
  receive, at the first or second category-management application, a route or directions from a current location of the vehicle from the navigation application.

5. The head unit of claim 1, wherein the processor is configured to execute further computer instructions to:
  receive, at the first or second category-management application, a voice-activated command from the user via an audio interface.

6. The head unit of claim 1, wherein the processor is configured to execute further computer instructions to:
  select a plurality of icons that are associated with the plurality of first user applications or the plurality of second user applications based on the first subset of content or second subset of content; and
  overlay the selected icons on a map in accordance with locations associated with the aggregated content.

7. The head unit of claim 1, wherein the processor is configured to aggregate the first subset of content with the second subset of content by executing further computer instructions to:
  select, from the first subset of content and the second subset of content, a single content to display via the output interface based on a location associated with the single content.

8. The head unit of claim 1, wherein the processor is configured to aggregate the first subset of content with the second subset of content by executing further computer instructions to:
  prioritize the first subset of content and the second subset of content based on a current distraction profile for the driver.

9. The head unit of claim 1, wherein the processor is configured to aggregate the first subset of content with the second subset of content by executing further computer instructions to:
  prioritize the first subset of content and the second subset of content based on a timeline factor associated with an expected next event.

10. A method to provide content to a user in a vehicle, comprising:
  providing a plurality of user applications and a plurality of category-management applications configured to communicate with the plurality of user applications;
  receiving a request from the user for content;
  selecting a first category-management application from the plurality of category-management applications based on the request;
  selecting, by the first category-management applications, a first subset of the plurality of user applications based on the request;
  interacting, by the first category-management applications, with the selected first subset of user applications to fulfill the request;
  receiving, by the first category-management application and from at least one of the selected first subset of user applications, first content in response to the request without direct interaction between the user and the selected first subset of user applications;
  selecting a second category-management application from the plurality of category-management applications based on the request;
  selecting, by the second category-management applications, a second subset of the plurality of user applications based on the request;
  interacting, by the second category-management applications, with the selected second subset of user applications to fulfill the request;
  receiving, by the second category-management application and from at least one of the selected second subset of user applications, second content in response to the request without direct interaction between the user and the selected second subset of user applications;
  coordinating, by the first category-management application and the second category-management application, aggregation of the first content and the second content to generate aggregated content to presented to the user based on the request; and
  presenting the aggregated content to the user.

11. The method of claim 10, wherein interacting with the selected first subset of user applications includes:
  providing an instruction to each of the selected first subset of user applications to cause each corresponding user application to execute commands as a background process to fulfill the request.

12. The method of claim 10, wherein receiving the request for content includes:
  receiving an input from the user via an icon representing one or more of the plurality of category-management applications or a graphical user interface of a navigation application.

13. The method of claim 10, wherein receiving the request for content includes:
  receiving verbal input from the user via an audio interface.

14. The method of claim 10, wherein presenting the aggregated content to the user includes:
  selecting one or more icons that are associated with the selected first subset of user applications and the selected second subset of user applications; and
  displaying the one or more icons on a map to provide locations associated with the selected first subset of user applications and the selected second subset of user applications.

15. The method of claim 10, wherein presenting the aggregated content to the user includes:
  generating audio related to the aggregated content; and
  outputting the audio to the user via an audio interface.

* * * * *